United States Patent [19]

Yamada

[11] Patent Number: 5,032,971
[45] Date of Patent: Jul. 16, 1991

[54] POWER SUPPLY SYSTEM FOR CONVERTING AN A.C. POWER SUPPLY VOLTAGE INTO D.C. POWER SUPPLY VOLTAGE

[75] Inventor: Masanori Yamada, Tokyo, Japan

[73] Assignee: NEC Corporation, Tokyo, Japan

[21] Appl. No.: 500,889

[22] Filed: Mar. 29, 1990

[30] Foreign Application Priority Data

Mar. 29, 1989 [JP] Japan .................................. 1-74865

[51] Int. Cl.[5] ............................................. H02M 7/00
[52] U.S. Cl. ......................................... 363/65; 363/70
[58] Field of Search ....................... 363/65, 67, 69, 70; 307/87

[56] References Cited

U.S. PATENT DOCUMENTS

| | | | |
|---|---|---|---|
| 3,579,085 | 5/1971 | Grodinsky | 363/70 |
| 4,106,087 | 8/1978 | Kawasaki | 363/70 |
| 4,736,286 | 4/1988 | Gulczynski | 363/70 |
| 4,833,582 | 5/1989 | Kupka | 363/70 |

*Primary Examiner*—Peter S. Wong
*Attorney, Agent, or Firm*—Burns, Doane, Swecker & Mathis

[57] ABSTRACT

The invention relates to a power supply system for an electronic device. The power supply system converts an A.C. power supply voltage into first and second D.C. power supply voltages. The system comprises two power supply units and a control unit. The control unit is actuated by a supply voltage from the first of the two power supply units and the control unit operates in conjunction with the power supply units.

13 Claims, 2 Drawing Sheets

POWER SUPPLY SYSTEM FOR CONVERTING AN A.C. POWER SUPPLY VOLTAGE INTO D.C. POWER SUPPLY VOLTAGE

BACKGROUND OF THE INVENTION

The invention relates to a power supply system for an electronic apparatus.

As will be described in detail below, a conventional power supply system for an electronic apparatus such as an information processing apparatus is provided with a plurality of power supply units for actually supplying a power supply voltage to the electronic apparatus and a control unit for controlling the units. The conventional system further requires another power supply unit for supplying a power supply voltage to the control unit, causing the total cost of the system to become higher.

An object of the invention is, therefore, to provide a power supply system free from the above-mentioned disadvantage of the conventional system.

SUMMARY OF THE INVENTION

According to an aspect of the invention, there is provided a power supply system for converting a main power supply voltage supplied from the outside into a first power supply voltage and supplying it to an electronic apparatus which comprises:

a first power supply unit actuated by the main power supply voltage to generate the first power supply voltage and a second power supply voltage;

at least one second power supply unit which is active only when supplied with both the main power supply voltage and the second power supply voltage to generate a third power supply voltage to be supplied to the electronic apparatus;

a control circuit which is actuated by the supply of the second power supply voltage and generates a unit stop signal upon receiving a system stop signal from the electronic apparatus; and memory means for storing the unit stop signal and, while storing the unit stop signal, inhibiting the generation of the second power supply voltage by the first power supply unit.

BRIEF DESCRIPTION OF THE DRAWINGS

Other features and advantages of the invention will become more apparent from the following detailed description when taken in conjunction with the accompanying drawings in which.

In the drawings, the same reference numerals represent the same structural elements, respectively.

DETAILED DESCRIPTION OF THE PREFERRED EMBODIMENT

To facilitate the understanding of the invention, description will first be made on a conventional power supply system.

Figure 1:
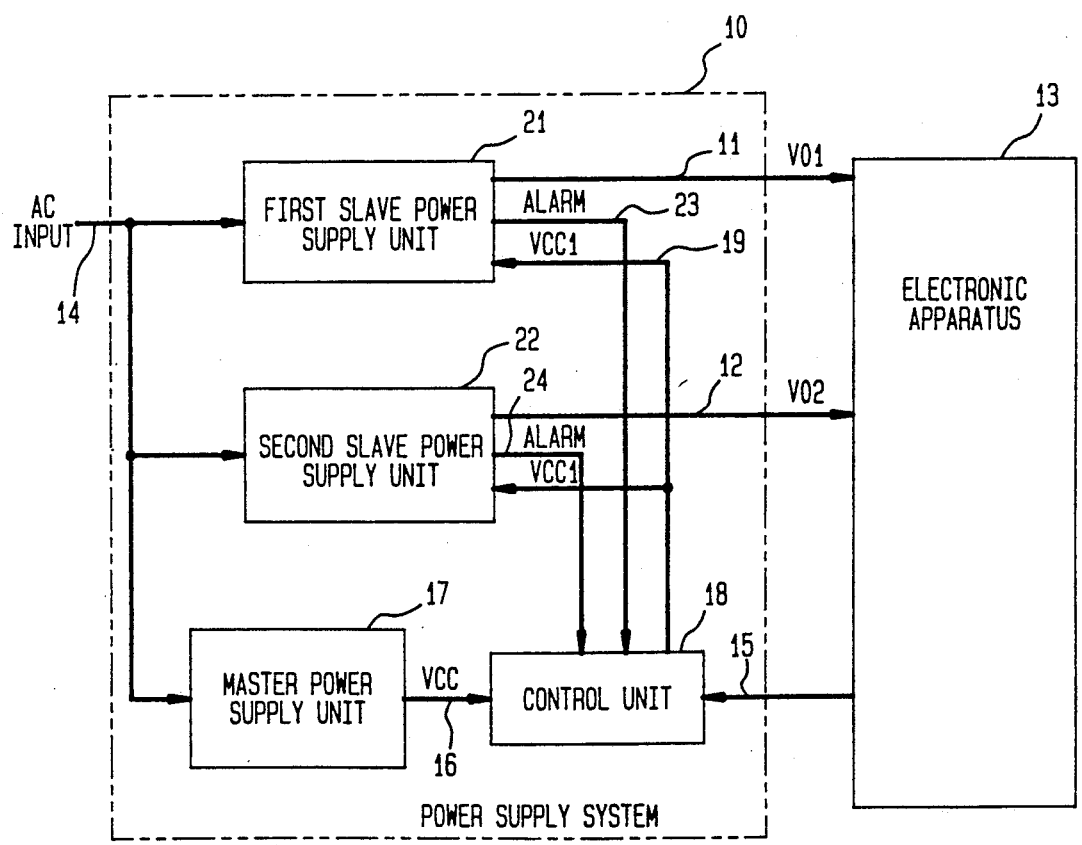
FIG. 1 is a block diagram of a conventional power supply system.

Referring to FIG. 1, a conventional power supply system 10 comprises a master power supply unit 17, a control unit 18, a first slave power supply unit 21 and a second slave power supply unit 22. The system 10 converts an A.C. power supply voltage (main power supply voltage) provided via a line 14 into first and second D.C. voltages $V_{01}$ and $V_{02}$ to supply them via lines 11 and 12 to an electronic apparatus 13 to actuate the apparatus 13.

The system 10, upon receiving a system stop (SS) signal from the apparatus 13 via a signal line 15, suspends the supply of the voltages $V_{01}$ and $V_{02}$ to the apparatus 13. The SS signal is generated by, for instance, inputting a power-off command through a keyboard to a central processing unit (CPU) (not shown) provided within the apparatus 13. In further detail, the CPU, upon receiving the power-off command, saves internal data of the CPU into an external memory unit (not shown), and then supplies the SS signal to the system 10 to turn it off.

The system 10, when supplied with the A.C. power supply voltage supplied from the line 14, produces a third D.C. voltage $V_{CC}$ from the unit 17 to a line 16. The unit 17 is, for example, an analog-to-digital converter.

The unit 18 is actuated upon receiving the voltage $V_{CC}$ from the unit 17, and produces the voltage $V_{CC}$ as it is to a line 19 as a fourth D.C. voltage $V_{CC1}$. The unit 18 connected to the apparatus 13, upon receiving the SS signal via the line 15 when operative, holds the SS signal in a holding circuit (not shown), and suspends the sending of the voltage $V_{CC1}$ as long as the SS signal is held by the holding circuit.

The unit 21 connected to the unit 18 and the apparatus 13 is actuated by the supply of the voltage $V_{CC1}$ from the unit 18 while being supplied with the A.C. voltage from the line 14, generates the voltage $V_{01}$ on the line 11, and supplies the voltage $V_{01}$ to the apparatus 13. The unit 21 is, for instance, an analog-to-digital converter.

The unit 22 connected to the unit 18 and the apparatus 13 is actuated by the supply of the voltage $V_{CC1}$ from the unit 18 while being supplied with the A.C. voltage from the line 14, generates the voltage $V_{02}$ on the line 12, and supplies the voltage $V_{02}$ to the apparatus 13. The unit 22 is, for instance, an analog-to-digital converter.

Thus, the system 10 is started up by supplying the A.C. voltage to the units 17, 21 and 22 via the line 14. As a result, the voltages $V_{01}$ and $V_{02}$ are supplied to the apparatus 13.

The system 10 is stopped when the SS signal is received by the unit 18 from the line 15. The SS signal, as described above, is held by the holding circuit of the unit 18, and as long as it is held by the holding circuit, the sending of the voltage $V_{CC1}$ from the unit 18 is suspended. As a result, the units 21 and 22 stop to operate, and the supply of the voltages $V_{01}$ and $V_{02}$ is suspended. After that, a power switch (not shown) provided in the unit 17 is manually turned off to stop the operation of the unit 17. As a result, the supply of the voltage $V_{CC}$ to the unit 18 is suspended, and so is the operation of the unit 18. At this time is released the holding of the SS signal by the holding circuit of the unit 18. The system 10 is stopped in this manner.

The unit 21 has a first alarm generation circuit (not shown) for detecting, when the unit 21 is active, abnormality therein and outputting a first alarm signal to a signal line 23. The abnormality may be, for instance, an abnormal voltage rise of the voltage $V_{01}$. Similarly, the unit 22 has a second alarm generation circuit (not shown) for detecting, when the unit 22 is active, abnormality therein, such as an abnormal voltage rise of the voltage $V_{02}$, and outputting a second alarm signal to a signal line 24. Upon occurrence of any such abnormality, the supply of the voltage $V_{01}$ or $V_{02}$ should be immediately stopped. If the supply of the voltage $V_{01}$ or $V_{02}$ having an abnormally high voltage value is continued, the hardware of the apparatus 13 may eventually be destroyed.

The unit 18, upon receiving the first or second alarm signal, holds the first or second alarm signal in the above-mentioned holding circuit as it does the SS signal, and suspends the supply of the voltage $V_{CC1}$ to the units 21 and 22 as long as the first or second alarm signal is held by the holding circuit. As a result, the supply of the voltages $V_{01}$ and $V_{02}$ to the apparatus 13 is stopped.

Thus, in the system 10, the units 21 and 22 are actuated and stopped by the unit 18. For this reason, the unit 17 is needed, besides the units 21 and 22, for the power supply to the unit 18.

Description will next be made on a preferred embodiment of the invention.

Figure 2:
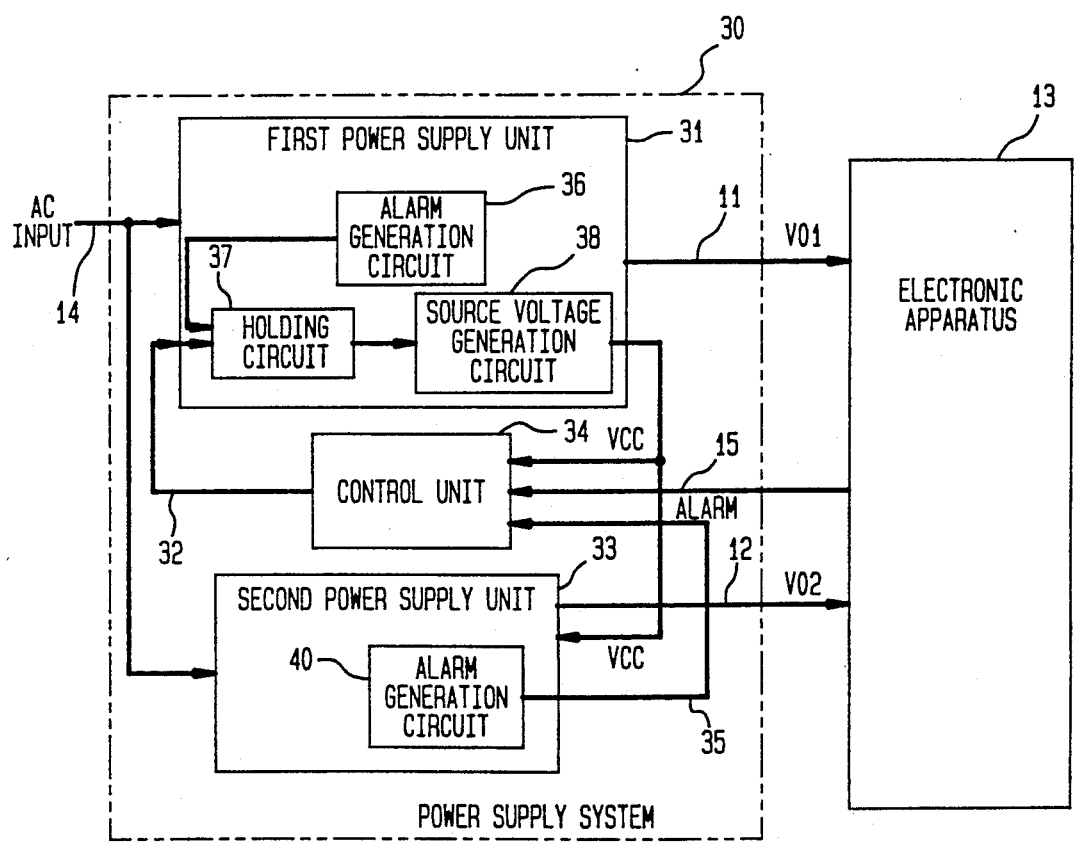
FIG. 2 is a block diagram of a preferred embodiment of the invention.

Referring to FIG. 2, a preferred embodiment of the invention comprises a power supply system 30 and an electronic apparatus 13. The system 30 further comprises a first power supply unit 31, a second power supply unit 33 and a control unit 34. The system 30, like the power supply system 10 of FIG. 1, converts an A.C. power supply voltage (main power supply voltage) supplied from a line 14 into first and second D.C. power supply voltages $V_{01}$ and $V_{02}$, and supplies the voltages $V_{01}$ and $V_{02}$ to the apparatus 13 via lines 11 and 12.

The unit 31, when supplied with the A.C. voltage from the line 14, generates the voltage $V_{01}$. The unit 31 also generates a third D.C. voltage $V_{CC}$ from its source voltage generation circuit 38, and supplies the voltage $V_{01}$ to the apparatus 13. The unit 31 is, for instance, an analog-to-digital converter whose primary side and secondary side circuits (not shown) are electrically insulated from each other. The unit 31, upon receiving a unit stop (US) signal via a signal line 32, stores the US signal in a holding circuit 37 arranged in the primary side circuit, and suspends the generation of the voltages $V_{01}$ and $V_{CC}$ as long as the US signal is held by the holding circuit 37.

The unit 33 connected to the unit 31 and the apparatus 13 is actuated upon receiving the voltage $V_{CC}$ from a line 16 while it is supplied with the A.C. voltage from the line 14, generates the voltage $V_{02}$, and supplies the voltage $V_{02}$ to the apparatus 13. The unit 33 is, for instance, an analog-to-digital converter whose primary side and secondary side circuits are electrically insulated from each other.

The unit 34 connected to the unit 31 and the apparatus 13 is actuated upon receiving the voltage $V_{CC}$ from the unit 31 via the line 16 and, if it receives a SS signal from the apparatus 13 via a line 15, produces the SS signal to the line 32 as the US signal. Thus, the SS signal supplied from the apparatus 13 over the line 15 is relayed by the unit 34 and supplied to the unit 31.

Thus, the system 30 is started up by the supply of the A.C. voltage from the line 14 to the units 31 and 33, and stopped as the unit 34 produces the US signal to the line 32 in response to the SS signal.

The unit 31 has a first alarm generation circuit 36 for detecting, when the unit 31 is active, abnormality therein, such as an abnormal voltage rise of the voltage $V_{01}$, to produce a first alarm signal. The holding circuit 37 of the unit 31 is also connected to the circuit 36, and the first alarm signal is also stored in the circuit 37.

The unit 33 also has a second alarm generation circuit 40 for detecting, when the unit 33 is active, abnormality therein, such as an abnormal voltage rise of the voltage $V_{02}$, to output a second alarm signal to a signal line 35. The unit 34 is also connected to the circuit 40 and, upon receiving the second alarm signal from the line 35 when it is active, transmits the second alarm signal to the line 32 as the US signal.

Thus, the operation of the system 30 is suspended upon generation of any of the first and second alarm signals.

The reactuation of the system 30 is achieved by once cutting off the A.C. voltage supplied from the line 14, initializing the holding circuit 37 and then resuming the supply of the A.C. voltage to the units 31 and 33.

While the invention has thus far been described in conjunction with the preferred embodiment thereof, it will now readily be possible for those skilled in the art to put the invention into practice in various other manners.

What is claimed is:

1. A power supply system for converting a main power supply voltage into a first power supply voltage and supplying said first power supply voltage to an electronic apparatus, comprising:
    a first power supply unit actuated by said main power supply voltage to generate said first power supply voltage and a second power supply voltage;
    at least one second power supply unit which is active only when supplied with both said main power supply voltage and said second power supply voltage to generate a third power supply voltage to be supplied to said electronic apparatus;
    a control circuit which is actuated by the supply of said second power supply voltage and generates a unit stop signal upon receiving a system stop signal from said electronic apparatus; and
    memory means for storing said unit stop signal and, while storing said unit stop signal, inhibiting the generation of said second power supply voltage by said first power supply unit.

2. A power supply system as claimed in claim 1, wherein said memory means is cleared by suspending the supply of said main power supply voltage.

3. A power supply system as claimed in claim 1, wherein said first power supply unit includes a source voltage generation circuit which generates said second power supply voltage.

4. A power supply system as claimed in claim 1, wherein said memory means includes:
    a holding circuit, for storing said unit stop signal and suspending the generation of said first and said second power supply voltages when said unit stop signal is held.

5. A power supply system as claimed in claim 4, wherein said first power supply unit includes a source voltage generation circuit which generates said second power supply voltage.

6. A power supply system as claimed in claim 4, wherein said first power supply unit further comprises a first alarm generation circuit operably connected to said holding circuit, said holding circuit adapted to store a resulting first alarm signal, and
    said at least one second power supply unit further comprises a second alarm generation circuit operably connected to said control circuit, said control circuit generating said unit stop signal when a second alarm signal is generated by said second alarm generation circuit, whereby each of said alarm generation circuits is adapted to generate an alarm signal when a system abnormality is detected.

7. A power supply system as claimed in claim 5, wherein said first power supply unit further comprises a first alarm generation circuit operably connected to said holding circuit, said holding circuit adapted to store a resulting first alarm signal, and said at least one second power supply unit further comprises a second alarm generation circuit operably connected to said control circuit, and control circuit generating said unit stop signal when a second alarm signal is generated by said second alarm generation circuit, whereby each of said alarm generation circuits is adapted to generate an alarm signal when a system abnormality is detected.

8. A power supply system as claimed in claim 7, wherein said first power supply unit is an analog-to-digital converter.

9. A power supply system as claimed in claim 7, wherein said at least one second power supply unit is an analog-to-digital converter.

10. A power supply system as claimed in claim 9, wherein said first power supply unit is an analog-to-digital converter.

11. A power supply system as claimed in claim 1, wherein said first power supply unit is an analog-to-digital converter.

12. A power supply system as claimed in claim 1, wherein said at least one second power supply unit is an analog-to-digital converter.

13. A power supply system as claimed in claim 12, wherein said first power supply unit is an analog-to-digital converter.

* * * * *